Patented May 26, 1936

2,042,117

UNITED STATES PATENT OFFICE 2,042,117

PROCESS FOR MAKING INDIUM-CONTAINING GLASS

William S. Murray, Utica, N. Y.

No Drawing. Application November 26, 1934, Serial No. 754,843

3 Claims. (Cl. 106—36.1)

My invention relates to an indium-containing glass and I declare the following to be a full, clear, concise and exact description thereof sufficient to enable anyone skilled in the art to which it appertains to make and use the same.

This invention is an improvement on my former invention which was filed in the Patent Office January 22, 1934, Serial Number 707,785 for Process of making yellow glass.

The invention not only includes an indium-containing glass but also the method of its production.

The new glass is made by suitably combining with other appropriate constituents a compound or compounds of indium and particularly indium sesquioxide.

In carrying out the process and in making the new glass, a compound of indium together with other substances, such as alkali and compounds of sulphur are heated together to such a temperature as will render the mixture fluid and homogeneous. For example, the following materials are mixed together in the proportions indicated below:

| | Parts by weight |
|---|---|
| Silicon dioxide | 5.58 |
| Sodium carbonate | 0.28 |
| Sodium sulphate | 2.12 |
| Calcium carbonate | 2.02 |
| Indium sesquioxide | 0.005 |

On cooling, a clear transparent yellow colored glass results.

Instead of using sodium or calcium compounds, other compounds can be employed as basic constituents.

The new glass of the present invention is characterized, from a chemical standpoint by its content of indium which may vary in amount, from a physical standpoint in that the greater amount of indium present the deeper will be the yellow color.

It will be seen that the glass of the present invention possesses a characteristic chemical property.

Having thus described my invention what I claim as new and desire to secure by Letters Patent is as follows:

1. The method of producing a transparent indium sesquioxide containing glass by fusing together a compound of indium, a compound of sulphur, silicon dioxide, sodium carbonate and calcium carbonate.

2. A transparent glass containing an indium compound, a sulphur compound, silicondioxide, and basic materials.

3. A yellow transparent glass produced by fusing a glass batch mixture of silicon dioxide, sodium carbonate, sodium sulfate, calcium carbonate and indium sesquioxide.

WILLIAM S. MURRAY.